(12) United States Patent
Laisure et al.

(10) Patent No.: US 11,852,200 B2
(45) Date of Patent: Dec. 26, 2023

(54) POWER TAKE-OFF WITH BELL HOUSING COOLING SYSTEM

(71) Applicant: Warner Electric Technology LLC, Braintree, MA (US)

(72) Inventors: Rodney R Laisure, Cherry /alley, IL (US); George Patrick Gill, Rockton, IL (US); Gary R. Haasch, Rockton, IL (US)

(73) Assignee: Warner Electric Technology LLC, Braintree, MA (US)

( * ) Notice: Subject to any disclaimer, the term of this patent is extended or adjusted under 35 U.S.C. 154(b) by 118 days.

(21) Appl. No.: 17/592,955

(22) Filed: Feb. 4, 2022

(65) Prior Publication Data

US 2023/0250854 A1 Aug. 10, 2023

(51) Int. Cl.
*F16D 13/72* (2006.01)
*F04D 29/38* (2006.01)
(Continued)

(52) U.S. Cl.
CPC ............. *F16D 13/72* (2013.01); *F04D 29/38* (2013.01); *F04D 29/541* (2013.01); *F16D 13/64* (2013.01);
(Continued)

(58) Field of Classification Search
CPC .. F16D 13/72; F16D 67/06; F16D 2300/2012; F16D 2300/26; F16D 13/64;
(Continued)

(56) References Cited

U.S. PATENT DOCUMENTS 2,205,629 A * 6/1940 Peterson ................. F16D 13/72
192/112
2,860,528 A * 11/1958 Butterfield .......... F16H 61/0211
475/155
(Continued)

FOREIGN PATENT DOCUMENTS

CN 204357978 U 5/2015
CN 105484849 A 4/2016
(Continued)

OTHER PUBLICATIONS

Logan Clutch Corp., "Logan Bell Housing PTO Clutches and FlexaDriveTM, Multiple Pump Drive Systems," (Oct. 23, 2017).
(Continued)

*Primary Examiner* — Richard M Lorence
(74) *Attorney, Agent, or Firm* — Reising Ethington P.C.

(57) ABSTRACT

A power take-off includes bell housing disposed about an axis and configured for coupling to a housing of an engine or other driving device at a first axial end and to a housing of a driven device at a second axial end. The bell housing defines an air inlet port and an air outlet port between the first and second axial ends. A clutch is disposed within the bell housing and configured to transfer torque from an input member coupled to the engine to an output member coupled to the driven device. A fan is configured for rotation with the input member to draw air into the bell housing through the air inlet port, move air through the bell housing from the air inlet port to the air outlet port in a substantially radial direction across the clutch and exhaust air from the bell housing through the air outlet port.

17 Claims, 5 Drawing Sheets

(51) Int. Cl.
*F04D 29/54* (2006.01)
*F16D 13/64* (2006.01)
*F16D 27/14* (2006.01)
*F16D 55/00* (2006.01)
*F16D 65/847* (2006.01)
*F16D 67/06* (2006.01)
*F16D 121/20* (2012.01)

(52) U.S. Cl.
CPC .............. *F16D 27/14* (2013.01); *F16D 55/00* (2013.01); *F16D 65/847* (2013.01); *F16D 67/06* (2013.01); *F16D 2121/20* (2013.01); *F16D 2300/0212* (2013.01); *F16D 2300/26* (2013.01)

(58) Field of Classification Search
CPC ........ F16D 27/14; F16D 55/00; F16D 65/847; F16D 2121/20; B60K 17/28; F04D 29/38; F04D 29/541
USPC ...................................... 192/113.23
See application file for complete search history.

(56) References Cited

U.S. PATENT DOCUMENTS

| | | | |
|---|---|---|---|
| 2,876,879 A | | 3/1959 | Maurice et al. |
| 3,777,864 A | * | 12/1973 | Marti ................. F16D 67/06 192/18 B |
| 4,646,902 A | * | 3/1987 | Maruyamano .......... F16D 13/72 192/112 |
| 8,701,855 B2 | | 4/2014 | MacMillian et al. |
| 2008/0210482 A1 | | 9/2008 | Ishii et al. |

FOREIGN PATENT DOCUMENTS

| | | | | |
|---|---|---|---|---|
| CN | 205173287 U | | 4/2016 | |
| CN | 205400879 U | | 7/2016 | |
| CN | 205400883 U | | 7/2016 | |
| CN | 106641013 A | | 5/2017 | |
| CN | 213371089 U | | 8/2020 | |
| CN | 213954199 U | | 8/2021 | |
| EP | 1988263 A2 | | 11/2008 | |
| GB | 1462276 A | * | 1/1977 | ........... F16D 65/847 |
| GB | 2097873 A | * | 11/1982 | ............. B60K 17/02 |
| JP | H06-75860 U | | 10/1994 | |
| WO | 2012/117457 A1 | | 9/2012 | |

OTHER PUBLICATIONS

International Search Report issued in corresponding International (PCT) Application No. PCT/US2022/048518 (dated Feb. 16, 2023).
Written Opinion issued in corresponding International (PCT) Application No. PCT/US2022/048518 (dated Feb. 16, 2023).

* cited by examiner

POWER TAKE-OFF WITH BELL HOUSING COOLING SYSTEM

BACKGROUND OF THE INVENTION a. Field of the Invention

This invention relates to power take-offs. In particular, the invention relates to a power take-off including means for cooling the interior of a bell housing of the power take-off to facilitate use of electromagnetic clutches and brakes.

b. Background Art

A conventional power take-off includes a clutch that is used to transfer torque from an engine flywheel to a driven device such as a shaft, gear or pulley. The clutch is housed within a bell housing that is coupled to the engine and which may also house the engine flywheel. Most conventional power take-offs employ mechanical clutches such as multi-disc clutches that are actuated using a lever through which an individual can manually engage or disengage the clutch. Mechanical clutches, however, have a number of disadvantages. The lever and other components of the actuating mechanism for a mechanical clutch increase part counts and creates packaging/space issues. Mechanical clutches also cannot be operated remotely or from a distance. Mechanical clutches also require relatively frequent adjustment.

The use of electromagnetic clutches in place of mechanical clutches in power take-offs could overcome many of the disadvantages associated with the use of mechanical clutches. Electromagnetic clutches, however, generate more heat than mechanical clutches due to the transmission of electrical current through conductors within the clutch. The interior of the bell housing is already subject to a relatively high air temperature due to heat emanating from the engine to which the bell housing is attached. The additional heat generated by an electromagnetic clutch further increases the air temperature within the bell housing and can lead to premature wear or breakdown of the clutch, bearings, seals and other components housed within the bell housing.

The inventors herein have recognized a need for a power take-off that will minimize and/or eliminate one or more of the above-identified deficiencies.

BRIEF SUMMARY OF THE INVENTION

This invention relates to power take-offs. In particular, the invention relates to a power take-off including means for cooling the interior of a bell housing of the power take-off to facilitate use of electromagnetic clutches and brakes.

A power take-off in accordance with one embodiment includes a bell housing disposed about an axis and configured for coupling to a housing of a driving device at a first axial end and to a housing of a driven device at a second axial end. The bell housing defines an air inlet port and an air outlet port between the first and second axial ends. The power take-off further includes a clutch disposed within the bell housing and configured to transfer torque from an input member coupled to the driving device to an output member coupled to the driven device. The power take-off further includes a fan configured for rotation with the input member to draw air into the bell housing through the air inlet port, move air through the bell housing from the air inlet port to the air outlet port in a substantially radial direction across the clutch and exhaust air from the bell housing through the air outlet port.

A power take-off in accordance with another embodiment includes a bell housing disposed about an axis and configured for coupling to a housing of a driving device at a first axial end and to a housing of a driven device at a second axial end. The bell housing defines an air inlet port and an air outlet port between the first and second axial ends. The power take-off further includes an electromagnetic clutch disposed within the bell housing and configured to transfer torque from an input member coupled to the driving device to an output member coupled to the driven device. The power take-off further includes an electromagnetic brake disposed within the bell housing and configured to apply a braking torque to the output member. The power take-off further includes a fan configured for rotation with the input member to draw air into the bell housing through the air inlet port, move air through the bell housing from the air inlet port to the air outlet port in a substantially radial direction across the electromagnetic clutch and the electromagnetic brake and exhaust air from the bell housing through the air outlet port.

A power take-off in accordance with the present teachings represents an improvement as compared to conventional power-take offs. In particular, the power take-off includes means for drawing outside air into the bell housing, moving that air through the bell housing and past heat-generating components, and exhausting the heated air from the bell housing in order to reduce temperatures within the bell housing. As a result, the power take-off facilitates the replacement of mechanical clutches with electromagnetic clutches thereby overcoming the disadvantages associated with the use of mechanical clutches. The power take-off also facilitates the use of an electromagnetic brake within the bell housing in combination with the electromagnetic clutch whereas conventional power-take offs locate brakes, if offered, external to the bell housing.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
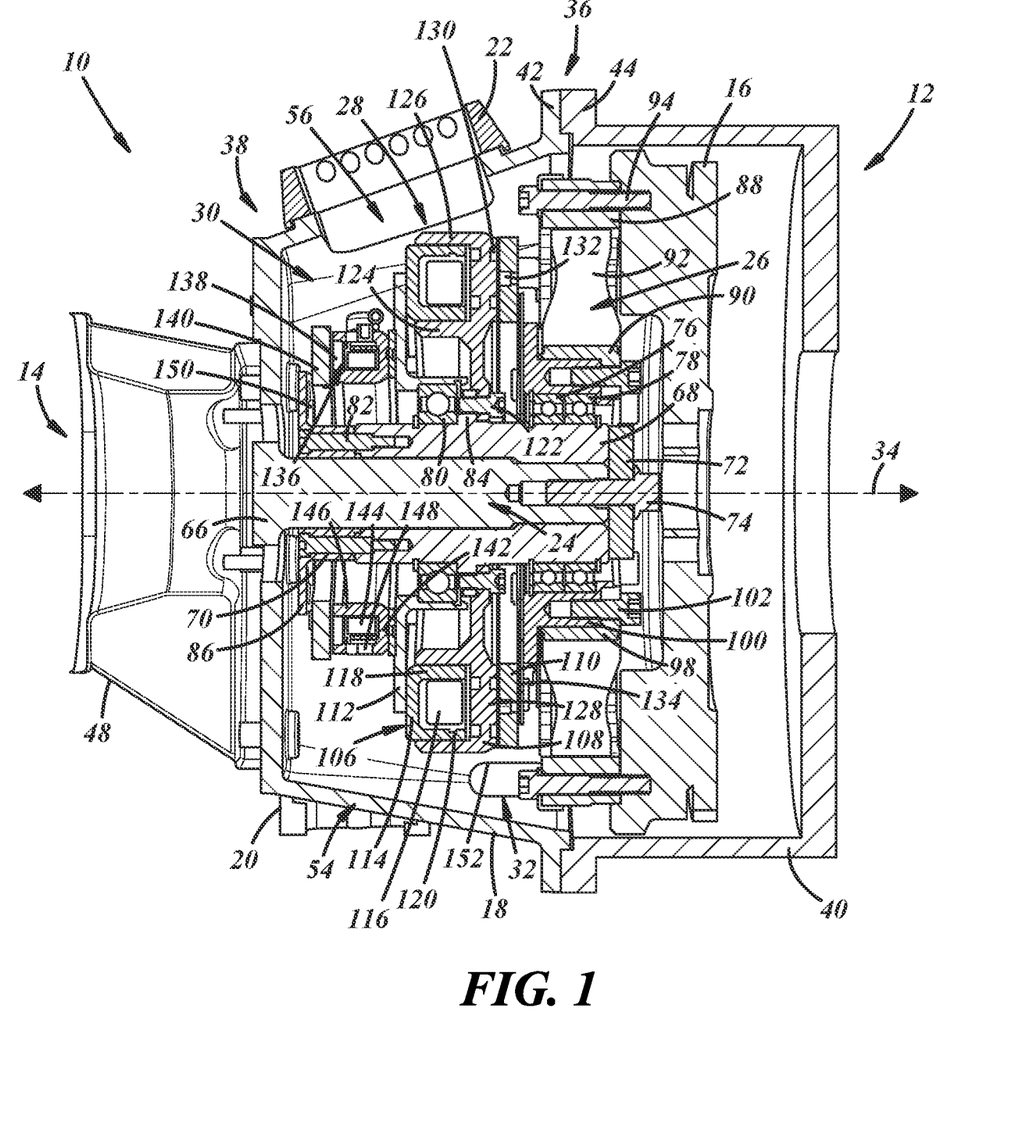
FIG. 1 is a cross-sectional view of a power take-off in accordance with one embodiment of the present teachings for transferring power from an engine to a driven device.

Referring now to the drawings wherein like reference numerals are used to identify identical components in the various views, FIG. 1 illustrate a power take-off (PTO) 10 for transmitting power from a driving device 12 to a driven device 14. PTO 10 transmits power from an input member coupled to driving device 12 to an output member coupled to driven device 14. The driving device 12 may comprise, for example, a gasoline or diesel-powered engine and the input member coupled to driving device 12 may comprise, for example, a flywheel 16. It should be understood, however, that driving device 12 may comprise another type of prime mover. The driven device 14 may comprise any of a wide variety of devices including, for example, an oil well pump jack, a stump grinder, a brush chippers, a fluid pump, a blower, a winch, or a gear box. The exact configuration of the driven device 14 will vary depending on the application, but includes an output member (not shown) such as a shaft, gear or pulley coupled to the driven device 14 and to which PTO 10 transmits power from flywheel 16 or another input member coupled to driving device 12. PTO 10 may include a bell housing 18, a screen 20, a fluid diffuser 22, an output shaft assembly 24, a shaft coupling 26, a clutch 28, and a brake 30, and a fan 32.

Figure 2:
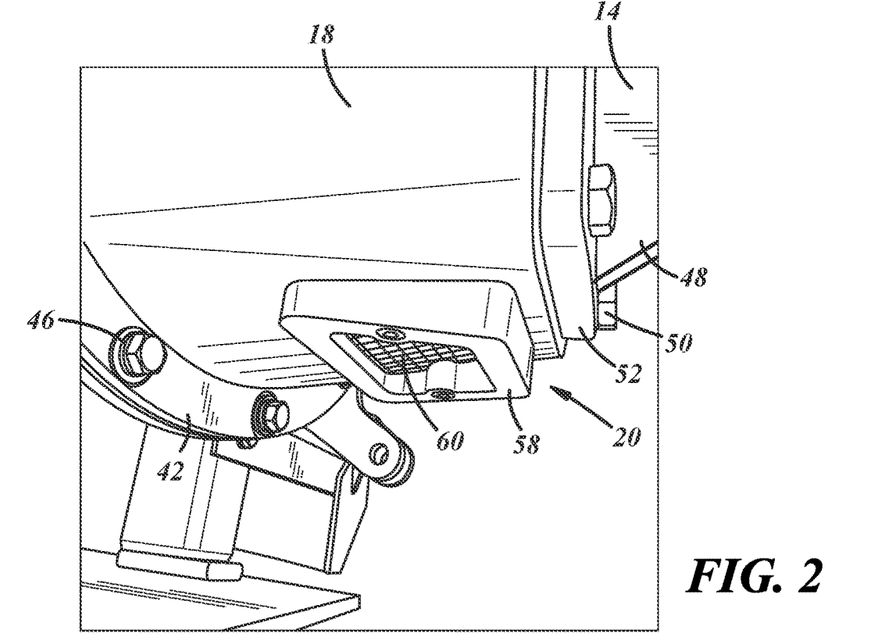
FIG. 2 is a perspective view of a portion of a portion of the bell housing of the power take-off of FIG. 1 showing an air inlet port in the bell housing.
Figure 3:
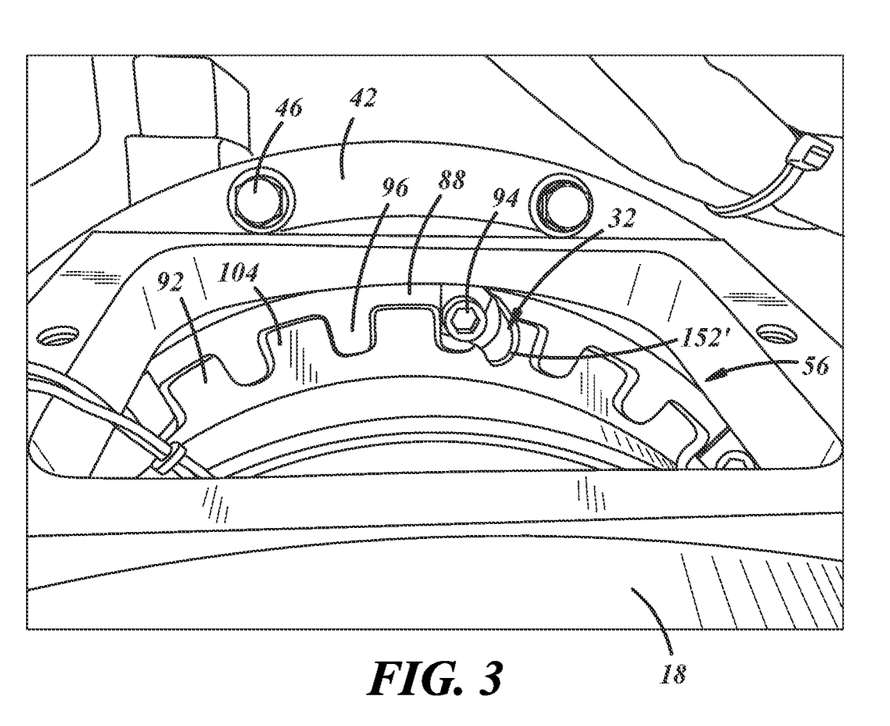
FIG. 3 is a perspective view of a portion of a portion of the bell housing of the power take-off of FIG. 1 showing an air outlet port in the bell housing and a portion of a fan.
Figure 4:
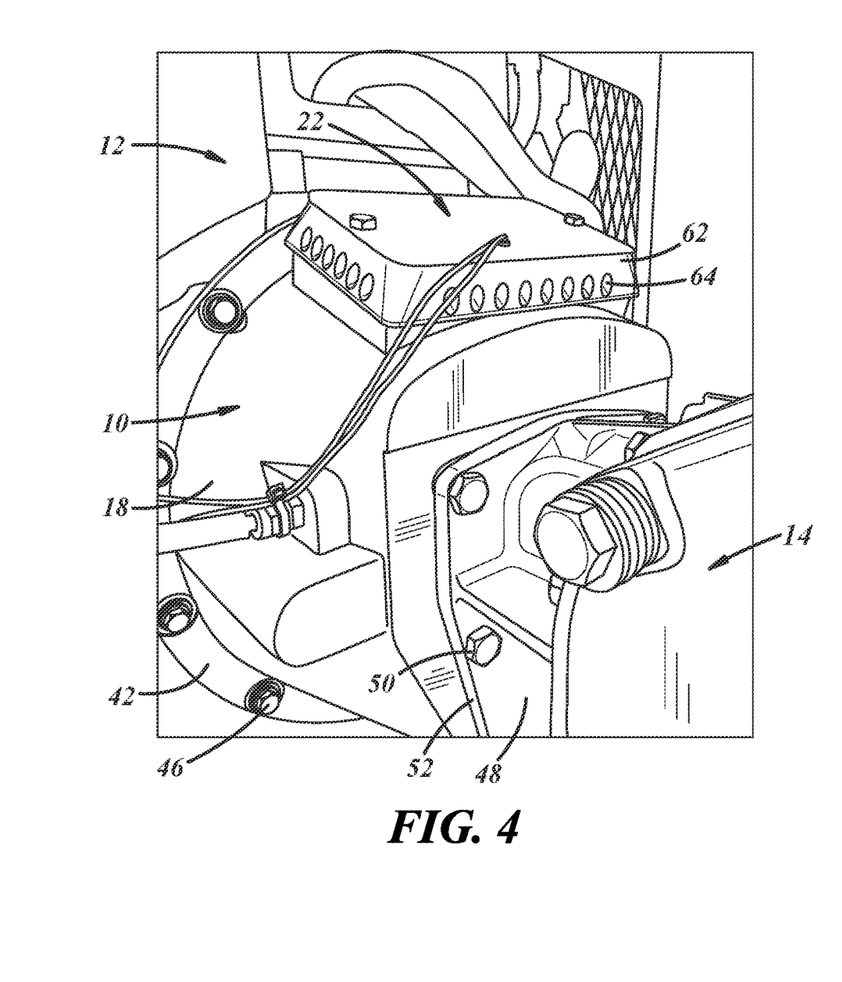
FIG. 4 is a perspective view of the power-take off of FIG. 1 illustrating a fluid diffuser for exhausting air from the bell housing.

Bell housing 18 houses many of the other components of PTO 10 and protects those components from foreign objects and elements. Housing 18 may be made from conventional metals, metal alloys and non-metallic composite materials. Housing 18 is disposed about, and may be centered about, an axis 34 that may comprise the rotational axis for flywheel 16, output shaft assembly 24, shaft coupling 26, elements of clutch 28 and brake 30, and fan 32. Housing 18 is tubular and generally bell-shaped, having a diameter thar generally tapers moving from one axial end 36 to an opposite axial end 38 of housing 18. End 36 of housing 18 is configured for coupling to a housing 40 of device 12 and may define a flange 42 configured to engage a corresponding flange 44 on housing 40. Referring to FIGS. 2-4, fasteners 46 such as bolts may extend through flanges 42, 44 to couple bell housing 18 to device housing 40. Referring again to FIG. 1, end 38 of housing 18 is configured for coupling to a housing 48 of driven device 14. Referring to FIGS. 2 and 4, fasteners 50 such as bolts may extend through an end flange 52 of housing 48 of driven device 14 and into an axial end face of bell housing 18 to couple bell housing 18 to housing 48 of driven device 14. Referring to FIG. 1, bell housing 18 further defines an air inlet port 54 and an air outlet port 56. Ports 54, 56 are disposed between ends 36, 38 of housing 18. The geometric centers of ports 54, 56 may be diametrically opposite one another on housing 18. When in use, housing 18 is preferably arranged such that air inlet port 54 faces towards earth ground while air outlet port 56 faces away from earth ground to take advantage of the fact that air within bell housing 18 will rise within housing 18 as it is heated and expands and becomes less dense. It should be understood, however, that position and spacing of ports 54, 56 may vary. In particular, ports 54, 56 may not be located in different circumferential positions on bell housing 18 than shown in the illustrated embodiment and may be spaced such that ports 54, 56 are circumferentially nearer to one another (i.e., such that the geometric centers of the ports 54, 56 are spaced less than 180 degrees from one another)

Screen 20 is provided to prevent entry of foreign objects and contaminants into the interior of bell housing 18 as air is drawn through air inlet port 54. Referring to FIG. 2, screen 20 may include a frame 58 that is coupled to housing 18 using conventional fasteners and that surrounds air inlet port 54. Frame 58 supports a mesh filter 60 through which air is drawn into bell housing 18 via air inlet port 54, but which prevents entry of large objects and contaminants.

Referring again to FIG. 1, fluid diffuser 22 is provided to distribute air exhausted from the interior of bell housing 18 through air outlet port 56 over a wider area while also cooling the air. Fluid diffuser 22 also inhibits the entry of water and other foreign objects and elements into the interior of bell housing 18 through air outlet port 56. Referring to FIG. 4, diffuser 22 includes a body 62 that is coupled to a mounting pad formed in bell housing 18 and surrounding air outlet port 56 using conventional fasteners. Body 62 is generally rectangular in shape but tapers moving away from bell housing 18 such that one or both pairs of opposing side walls of body 62 are angled relative to each end wall of body 62. Body 62 surrounds outlet port 56 and a conventional seal (not shown) may be disposed between body 62 and bell housing 18 and around port 56. Body 62 includes an inlet (not shown) aligned with air outlet port 56 in bell housing 18 and through which fluid exhausted from bell housing 18 enters body 62 of diffuser 22. Body 62 further defines a plurality of outlet passages 64 in fluid communication with the inlet in body 62 and the air outlet port 56 in bell housing 18 and that are configured to exhaust the air from body 62 of diffuser 22. In the illustrated embodiment, outlet passages 64 terminate in some or all of the sidewalls of body 62. Further, some or all of outlet passages 64 may be configured with a downward slope or angle such that one end (the inlet) of outlet passage 64 through which air from air outlet port 56 of housing 18 and the inlet of body 62 enters passage 64 is further from axis 34 than the opposite end (the outlet) of outlet passage 64 through which air exits outlet passage 64 and diffuser 22. In this matter, diffuser 22 inhibits entry of water and other contaminants through air outlet port 56 and into the interior of bell housing 18. Although a particular configuration for diffuser 22 is shown in the illustrated embodiment, it should be understood that the configuration of diffuser 22 may vary.

Referring again to FIG. 1, output shaft assembly 24 is provided for transmission of both (i) a driving torque provided by flywheel 16 or another input member coupled to driving device 12 and (ii) a braking torque provided by brake 30 to an output member coupled to driven device 14. Shaft assembly 24 includes a shaft 66, hubs 68, 70, and means, such as spacer 72 and fastener 74, for inhibiting movement of hubs 68, 70, relative to shaft 66 along axis 34.

Shaft 66 is provided for coupling to the output member coupled to driven device 14. Shaft 66 is disposed about, and may be centered about, axis 34. One axial end of shaft 66 is configured for coupling to the output member coupled to driven device 14. It should be understood that the configuration of this axial end of shaft 66 will depend on the nature and configuration of the output member coupled to driven device 14. The other axial end of shaft 66 defines a bore configured to receive fastener 74. A radially outer surface of shaft 66 may define a plurality of splines for a purpose described below.

Hub 68 is provided to support a portion of clutch 28 for rotation with hub 68 and shaft 66. Hub 68 is tubular and is disposed about a portion of shaft 66. Hub 68 may be disposed about, and may be centered about axis 34. A radially inner surface of hub 68 may define a plurality of splines configured to engage corresponding splines on shaft 66 in order to couple hub 68 to shaft 66 for rotation therewith. It should be understood that shaft 66 and hub 68 may be rotatably coupled in other ways including through use of keys and keyways and interlocking lugs. A radially outer surface of hub 68 is configured to support several bearings 76, 78, 80 configured to permit relative rotation of shaft assembly 24 and components of shaft coupling 26, clutch 28, brake 30 and fan 32 as discussed in greater detail below. One axial end of hub 68 defines a plurality of bores configured to receive fasteners 82 used to coupled hub 70 to hub 68. Hub 68 further defines a radially outwardly extending flange 84 for a purpose discussed below.

Hub 70 is provided to support a portion of brake 30 for rotation with hub 70 and shaft 66. Hub 70 is tubular and is disposed about a portion of shaft 66. Hub 70 may be disposed about, and may be centered about axis 34. One axial end of hub 70 defines a radially outwardly extending flange 86 configured for coupling to a portion of brake 30 as discussed in greater detail hereinbelow. The other axial end of hub 70 faces a corresponding axial end of hub 68. Hub 70 defines a plurality of axially extending bores configured to receive fasteners 82 used to couple hub to hub 68 for rotation with hub 68 and shaft 66.

Spacer 72 and fastener 74 provide a means for inhibiting movement of hubs 68, 70 relative to shaft 66 along axis 34 in one direction (to the right in FIG. 1). Movement of hubs 68, relative to shaft 66 along axis 34 in the opposite direction is constrained by bell housing 18. Spacer 72 is disposed at one axial end of shaft 66 and hub 68 and defines a bore configured to receive fastener 74. Fastener 74 extends through the bore in spacer 72 and into an aligned bore in shaft 66 and may be secured within the bore through mating threads on fastener 74 and within the bore.

Shaft coupling 26 is provided to enable the transmission of torque, through clutch 28, from flywheel 16 or another input member coupled to driving device 12 to output shaft assembly 24 and an output member coupled to driven device 14 while permitting some degree of misalignment between flywheel 16 and output shaft assembly 24. Coupling 26 includes a drive ring 88, a driven ring 90 and an elastomeric body 92 disposed between drive ring 88 and driven ring 90.

Drive ring 88 is provided for coupling to flywheel 16 and may be coupled to flywheel 16 using conventional fasteners 94 such as bolts extending through and into aligned bores in drive ring 88 and flywheel 16. Drive ring 88 is disposed about, and may be centered about, axis 34 for rotation about axis 34. Referring to FIG. 3, drive ring 88 may define a plurality of radially inwardly projecting teeth or lugs 96 configured to engage elastomeric body 92.

Referring again to FIG. 1, driven ring 90 is disposed radially inward of drive ring 88. Driven ring 90 may likewise be disposed about, and may be centered about, axis 34 for rotation about axis 34. Driven ring 90 may include two members 98, 100 coupled together through a plurality of fasteners 102. Member 98 is disposed radially outwardly of member 100 and is sized to receive and support elastomeric body 92 thereon which may be joined to member 98 through vulcanization. Member 100 is disposed radially inwardly of member 98. Member 100 is sized to receive bearings 76, 78 disposed between hub 68 of output shaft assembly 24 and driven ring 90. Member 100 also provides a means for supporting a component of clutch 28 as described in greater detail below.

Body 92 is provided to transmit forces from drive ring 88 to driven ring 90 while allowing some degree of relative movement between drive ring 88 and driven ring 90 to account for misalignment between flywheel 16 and output shaft assembly 24 and transmission components between the two. Body 92 is made from an elastomeric material. Referring to FIG. 3, body 92 defines a plurality of radially outwardly projecting teeth of lugs 104 configured to engage lugs 96 in drive ring 88 to couple body 92, and driven ring 90, to drive ring 88 for rotation therewith.

Referring again to FIG. 1, clutch 28 is provided for selective transmission of torque from flywheel 16 or another input member coupled to driving device 12 to output shaft assembly 24 and, consequently, to an output member coupled to driven device 14. In accordance with one aspect of the present teachings, clutch 28 comprises an electromagnetic clutch. As a result, clutch 28 does not require a lever or other mechanical actuator and can be operated remotely or from a distance. Clutch 28 is also smaller in size, thereby improving the packaging of PTO 10, and does not require adjustment unlike mechanical clutches found in many conventional power take-offs. Clutch 28 includes an electromagnet 106, a rotor 108, and an armature 110.

Electromagnet 106 creates an electromagnetic circuit among electromagnet 106, rotor 108 and armature 110 to cause movement of armature 110 towards and into engagement with rotor 108 and transmission of torque from armature 110 to rotor 108. Electromagnet 106 is disposed on one axial side of rotor 108 and includes a hub 112, a field shell 114 and a conductor 116.

Hub 112 is provided to support and orient field shell 114 and conductor 116. Hub 112 is annular in shape and is disposed about, and may be centered about, axis 34. Hub 112 is configured to receive output shaft assembly 24 which extends through hub 112 and bearing 80 disposed between output shaft assembly 24 and hub 112 which allows rotation of output shaft assembly 24 relative to hub 112. Hub 112 may be fixed against rotation within bell housing 18. Hub 112 defines a radially extending flange configured to support and position field shell 114 and conductor 116.

Field shell 114 is configured to house conductor 116. Field shell 114 also forms part of an electromagnetic circuit that causes the selective engagement of rotor 108 and armature 110. Field shell 114 may be made from conventional metals and metal alloys, including steel. Field shell 114 is generally U-shaped in cross-section and includes axially extending, radially aligned inner and outer poles 118, 120. Field shell 114 may define an aperture through which current may be provided from an external power source to conductor 116.

Conductor 116 is provided to create an electromagnetic circuit among field shell 114, rotor 108, armature 110 to cause movement of armature 110 and urge armature 110 into engagement with rotor 108 to enable transmission of torque from coupling 26 to output shaft assembly 24. Conductor 116 is generally annular and is disposed about axis 34 within field shell 114. In particular, conductor 116 is disposed between the inner and outer poles 118, 120 of field shell 114. Conductor 116 may comprise a conventional copper coil although other known conductors may alternatively be used. Conductor 116 may be connected electrically to a power supply (not shown) such as a battery. Upon energization of conductor 116, an electromagnetic circuit is formed between field shell 114, rotor 108, and armature 110.

Rotor 108 is provided for selective engagement with armature 110 to transmit torque from shaft coupling 26 to output shaft assembly 24. Rotor 108 is disposed about, and may be centered about, axis 34 and is coupled to output shaft assembly 24 for rotation therewith. Rotor 108 defines a central bore through which output shaft assembly 24 extends. A radially inner portion of rotor 108 defines a recess configured to receive flange 84 of hub 68 of output shaft assembly 24. Fasteners 122 extend through rotor 108 and flange 84 of hub 68 to couple rotor 108 and output shaft assembly 24 for rotation. A radially outer portion of rotor 108 defines axially extending, radially aligned inner and outer poles 124, 126 and a radially extending wall 128 extending therebetween. Poles 124, 126 and wall 128 together define a recess configured to receive field shell 114 and conductor 116. Poles 124, 126 are aligned with poles 118, 120, in field shell 114 and provide a pathway for magnetic flux between field shell 114 and rotor 108 when electromagnet 106 is energized and current is provided to conductor 116. Wall 128 defines a clutch engagement surface facing armature 110. Wall 128 may include a plurality of radially spaced rows of angularly spaced slots 130 that may be empty or filed with a non-magnetic material. Upon energization of electromagnet 106, the slots 130 cause magnetic flux to travel back and forth between rotor 108 and armature 110 across the air gap between rotor 108 and armature 110 enabling a high torque engagement between rotor 108 and armature 110

Armature 110 is provided to transmit torque from shaft coupling 26 to rotor 108 and, as a result, from flywheel 16 or another input member coupled to driving device 12 to output shaft assembly 24 and an output member coupled to output shaft assembly 24 and driven device 14. Armature 110 may be made from a variety of conventional metals and metal alloys including steel. Armature 110 is annular in construction and is disposed about, and may be centered about, axis 34. Armature 110 is disposed on one axial side of rotor 108 opposite electromagnet 106 and defines a clutch engagement surface facing rotor 108. Armature 110 is axially spaced from rotor 108 by an air gap. Like rotor 108, armature 110 may include one or more radially spaced rows of angularly spaced slots 132 that are empty or filled with an on-magnetic material to facilitate travel of magnetic flux back and forth between rotor 108 and armature 110 upon energization of electromagnet 106. Armature 110 is coupled to driven ring 90 of shaft coupling 26. In particular, armature 110 may be coupled to member 100 of driven ring 90 by a plurality of leaf springs 134 extending between armature 110 and member 100 of driven ring 90 that bias armature 110 in a direction towards shaft coupling 26 and away from rotor 108.

Although clutch 28 comprises an electromagnetic clutch in the illustrated embodiment and a PTO 10 in accordance with the present teachings facilitates use of an electromagnetic clutch, it should be understood that a mechanical clutch or electromechanical clutch could alternatively be used in place of the electromagnetic clutch 28. In an embodiment with a mechanical clutch, for example, rotor 108 and armature 110 may be replaced by conventional discs that are urged into engagement by a mechanical actuator replacing electromagnet 106.

Brake 30 is provided to halt rotation of output shaft assembly 24 and, as a result, the output member coupled to driven device 14. In accordance with one aspect of the present teachings, brake 30 comprises an electromagnetic brake that is contained within bell housing 18. Brakes used in combination with conventional power take-offs often must be installed external to the bell housing in part because of the frictional heat generated during braking. The disclosed PTO 10, however, facilitates location and use of the electromagnetic brake within the bell housing despite the additional heat generated by an electromagnetic brake relative to other types of brakes. Brake 30 includes an electromagnet 136, a friction disc 138, and an armature 140.

Electromagnet 136 creates an electromagnetic circuit among electromagnet 136 and armature 140 to cause movement of armature 140 towards and into engagement with friction disc 138 and transmission of a braking torque from friction disc 138 to armature 140. Electromagnet 136 includes hub 112, a field shell 142 and a conductor 144. In accordance with one aspect of the inventive PTO 10, hub 112 is shared between the electromagnets 106, 136 forming a part of clutch 28 and brake 30. Further description of hub 112 may be found above.

Field shell 142 is configured to house conductor 144. Field shell 142 also forms part of an electromagnetic circuit that causes the selective engagement of friction disc 138 and armature 140. Field shell 142 may be made from conventional metals and metal alloys, including steel. Field shell 142 is generally U-shaped in cross-section and includes axially extending, radially aligned inner and outer poles 146, 148. Field shell 142 may define an aperture through which current may be provided from an external power source to conductor 144.

Conductor 144 is provided to create an electromagnetic circuit among field shell 142 and armature 140 to cause movement of armature 140 towards and into engagement with friction disc 138 and transmission of a braking torque from friction disc 138 to armature 140 and, therefore, to output shaft assembly 24 and an output member coupled to driven device 14. Conductor 144 is generally annular and is disposed about axis 34 within field shell 142. In particular, conductor 144 is disposed between the inner and outer poles 146, 148 of field shell 142. Conductor 144 may comprise a conventional copper coil although other known conductors may alternatively be used. Conductor 144 may be connected electrically to a power supply (not shown) such as a battery. Upon energization of conductor 144, an electromagnetic circuit is formed between field shell 142 and armature 140.

Friction disc 138 provides a brake engagement surface facing armature 140 and is configured for selective engagement with armature 140 to brake rotation of armature 140 and output shaft assembly 24 and, as a result, an output member coupled to driven device 14. Friction disc 138 may be made from conventional friction materials having a relatively high magnetic reluctance. Disc 138 is annular in shape and is configured to be received between poles 146, 148 of field shell 142 and fixed against rotation. Disc 138 may project slightly outward beyond poles 146, 148 such that disc 138 is nearer to armature 140 than the axial ends of poles 146, 148.

Armature 140 is provided to transmit a braking torque from friction disc 138 to output shaft assembly 24 and, as a result, to an output member coupled to driven device 14. Armature 140 may be made from a variety of conventional metals and metal alloys including steel. Armature 140 is annular in construction and is disposed about, and may be centered about, axis 34. Armature 140 defines a brake engagement surface facing friction disc 138. Armature 140 is axially spaced from friction disc 138 by an air gap. Armature 140 is coupled to output shaft assembly 24. In particular, armature 140 may be coupled to flange 86 of hub 70 of output shaft assembly 24 by a plurality of leaf springs 150 extending between armature 140 and flange 86 that bias armature 140 in a direction towards flange 86 and away from friction disc 138.

Figure 5:
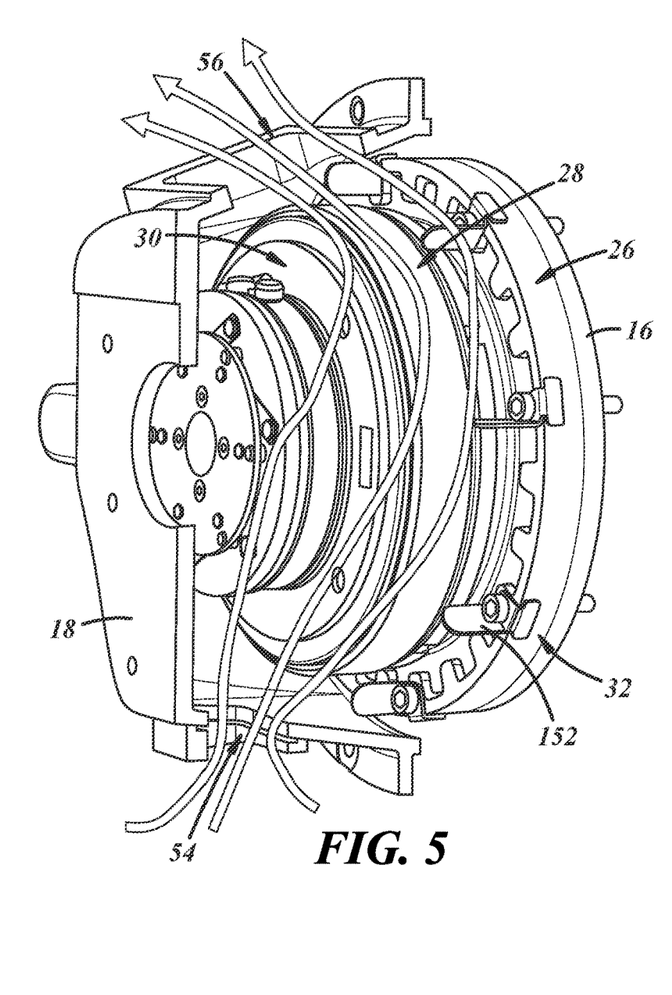
FIG. 5 is a perspective view of a portion of the power take-off of FIG. 1 illustrating air flow through the bell housing.

Fan 32 provides a means for drawing air into bell housing 18 through air inlet port 54, moving air through bell housing 18 to air outlet port 56 and exhausting air from bell housing 18 through air outlet port 56. Referring to FIG. 5, in accordance with one aspect of the present invention, fan 32 moves air through bell housing 18 in a substantially radial directly (relative to axis 34) through bell housing 18 so that the air is moved across clutch 28 and brake 30 to both cool clutch 28 and brake 30 and remove heat generated by clutch 28 and brake 30 from bell housing 18 (along with heat generated within bell housing 18 from other sources such as driving device 12).

In accordance with one embodiment, fan 32 comprises a plurality of blades 152 that are formed in or attached to a rotating component within bell housing 18. Although blades 152 could be formed in or attached to any component of PTO 10 that rotates within bell housing 18, blades 152 are preferably configured for rotation with flywheel 16 or another input member coupled to driving device 12 so that fan 32 is in continuous operation. Therefore, blades 152 are preferably formed in or attached to a component of PTO 10 that rotates continuously with flywheel 16. For example, blades 152 may be formed in or attached to a member of shaft coupling 26 such as drive ring 88 as shown in FIGS. 1 and 5. Alternatively, blades 152 may be formed in or attached to another component of shaft coupling 26 or to armature 110 of clutch 28. In the case of a mechanical clutch, blades 152 could be formed in or attached to a friction disc that is configured for rotation with the flywheel 16 or other input member. As noted above, blades 152 may alternatively be formed in or attached to components of PTO 10 that rotate within bell housing 18 only intermittently. These components may, for example, comprise rotor 108 of clutch 28 or armature 140 of brake 30.

Figure 6:
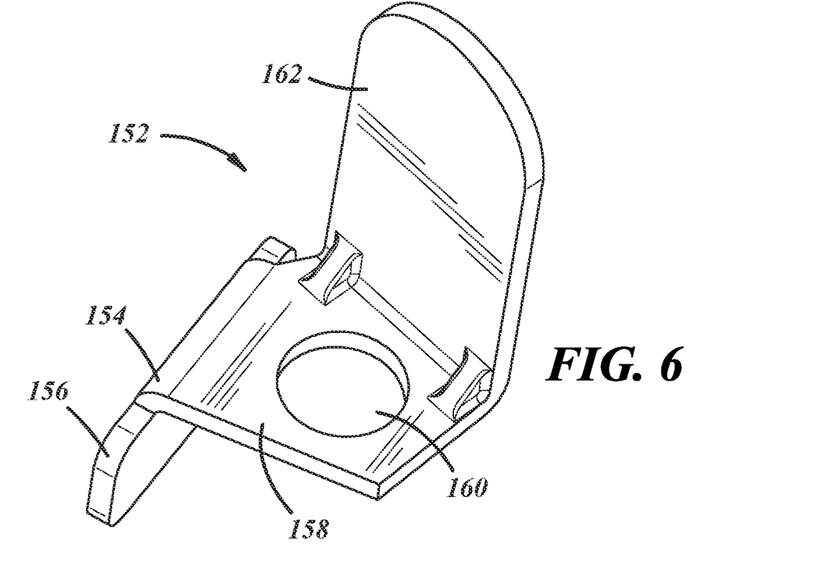
FIG. 6 is a perspective view of a one embodiment of a fan blade for use in the power take-off of FIG. 1.

Referring to FIG. 6, blades 152 may be configured for attachment to a rotating component of PTO 10 such as drive ring 88 of shaft coupling 26. Each blade 152 may include a first portion 154 defining a generally L-shaped bracket configured for engagement with drive ring 88. One leg 156 of portion 154 is configured to engage a radially outer surface of drive ring 88. The other leg 158 of portion 154 is configured to engage an axial end surface of drive ring 88 and defines a bore 160 configured to receive a fastener for coupling blade 152 to drive ring 88. As shown in FIGS. 1 and 5, the fasteners may comprise the same fasteners 94 used to couple drive ring 88 to flywheel 16. Referring again to FIG. 6, each blade 152 further includes a second portion 162 extending from leg 158 of portion 154 in a direction opposite to leg 156 of portion 154. As shown in FIGS. 1 and 5, portion 162 of blade 152 extends in a generally axial direction (relative to axis 34). As shown in FIG. 5, upon rotation of drive ring 88, the configuration of portion 162 of blade 152 create a force that draws air inward through air inlet port 54 in bell housing 18, moves air through housing 18 from air inlet port 54 to air outlet port 56 in a substantially radial direction across clutch 28 and brake 30 and exhausts air from housing 18 through air outlet port 56. In the illustrated embodiment, portion 162 of blade 152 is generally rectangular in shape but has an end facing away from portion 154 of blade 152 that is semicircular in shape. Portion 162 is also substantially flat. It should be understood, however, that the shape of portion 162 of blade 152 may vary. Referring to FIG. 3, for example, in accordance with another embodiment a blade 152' is curved rather than flat. In particular, blade 152' forms a circular arc. Blade 152' is preferably oriented so that a center of curvature of the circular arc is disposed on a forward side of the circular arc relative to the direction of rotation of the flywheel 16 or other input member coupled to driving device 12 (and to the components of PTO 10 such as drive ring 88 that are coupled to the flywheel 16). In the embodiment shown in FIG. 3, therefore, flywheel 16 and drive ring 88 (along with other component of shaft coupling 26 and armature 110 of clutch 28) would rotate in a counterclockwise direction. This orientation of blade 152' may enhance air flow within bell housing 18.

Figure 7:
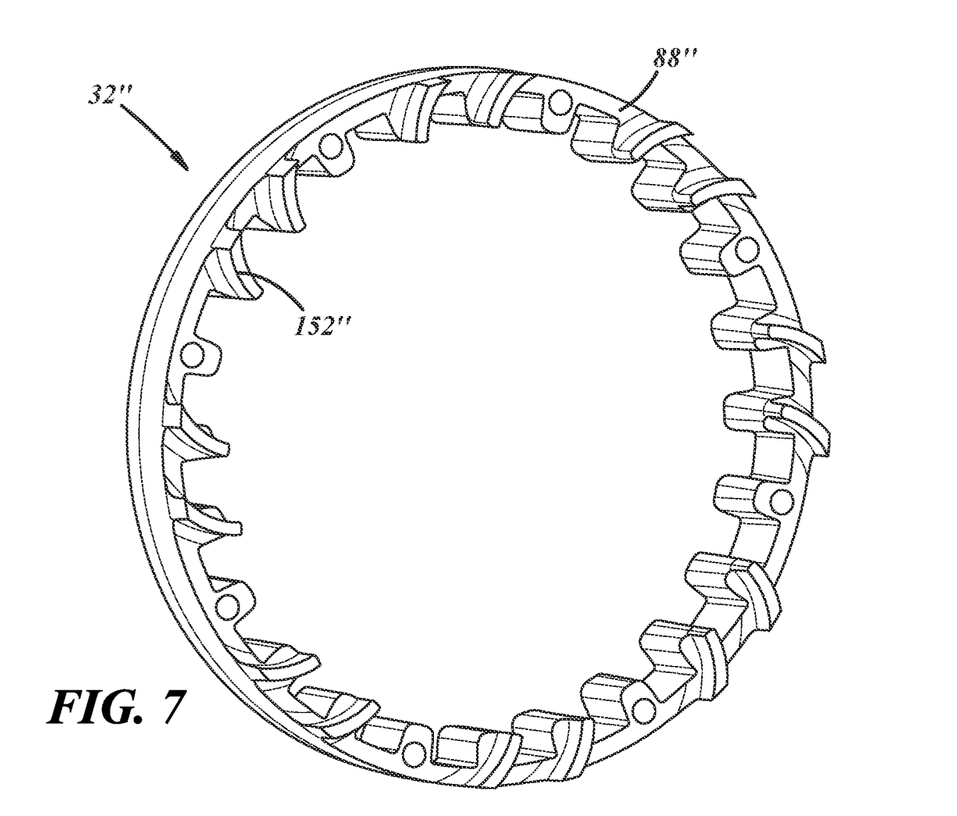
FIG. 7 is a perspective view of one embodiment of a fan for use in the power take-off of FIG. 1.
Figure 8:
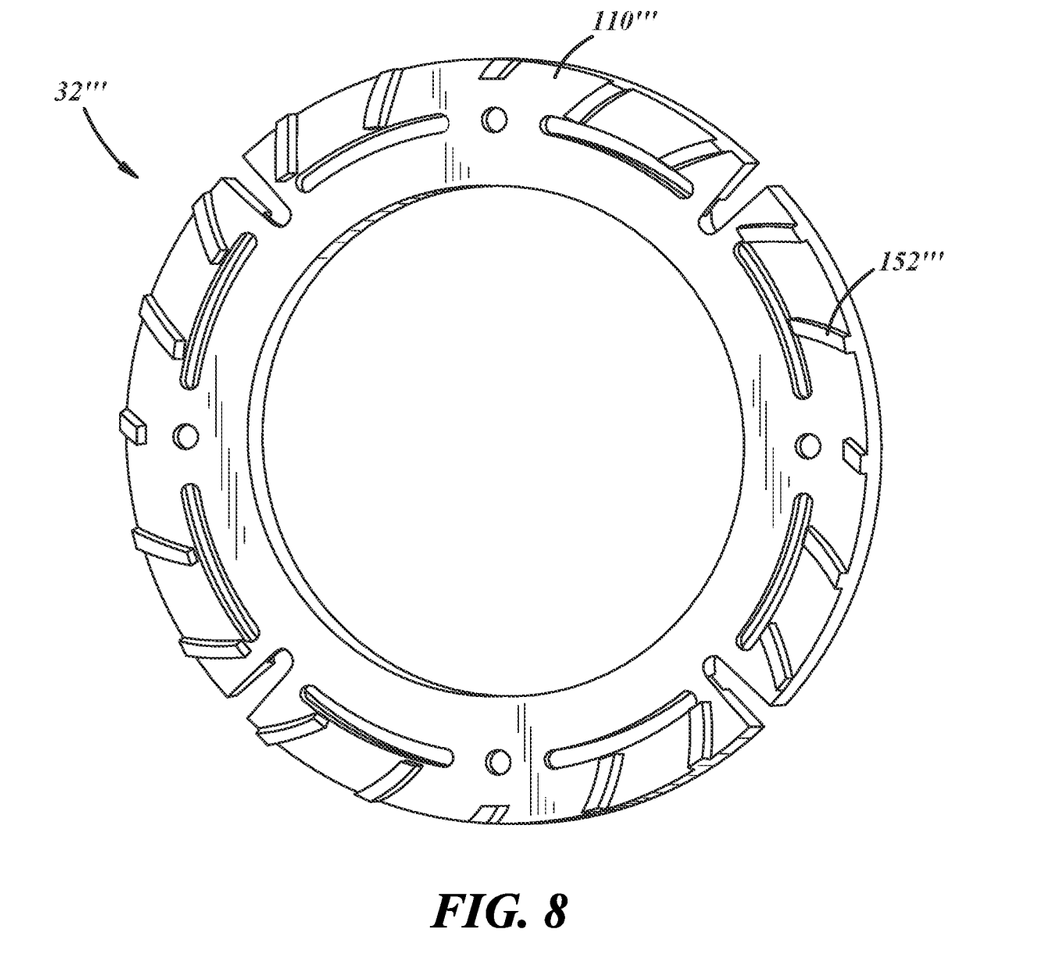
FIG. 8 is a perspective view of another embodiment of a fan for use in the power take-off of FIG. 1.

In the embodiments illustrated in FIGS. 1, 3 and 5, blades 152 and 152' are separate components that are attached to drive ring 88 or another rotating component within PTO 10. Referring to FIG. 7, in an alternative embodiment, a fan 32" may include blades 152" that are formed integrally with the drive ring 88" or another rotating component within PTO 10 such that blades 152" and drive ring 88" form a unitary (one-piece) structure and no fasteners such as bolts, welds, adhesives, etc. are required for coupling blades 152" and drive ring 88". Referring to FIG. 8, in another alternative embodiment, a fan 32''' includes blades 152''' that are formed integrally with an armature 110" of an electromagnetic clutch.

A power take-off 10 in accordance with the present teachings represents an improvement as compared to conventional power-take offs. In particular, the power take-off 10 includes means 32 for drawing outside air into the bell housing 18, moving that air through the bell housing 18 and past heat-generating components 28, 30, and exhausting the heated air from the bell housing 18 in order to reduce temperatures within the bell housing 18. As a result, the power take-off 10 facilitates the replacement of mechanical clutches with electromagnetic clutches 28 thereby overcoming the disadvantages associated with the use of mechanical clutches. The power take-off also facilitates the use of an electromagnetic brake 30 within the bell housing 18 in combination with the electromagnetic clutch 28 whereas conventional power-take offs locate brakes, if offered, external to the bell housing.

While the invention has been shown and described with reference to one or more particular embodiments thereof, it will be understood by those of skill in the art that various changes and modifications can be made without departing from the spirit and scope of the invention.

What is claimed is:

1. A power take-off, comprising:
   a bell housing disposed about an axis and configured for coupling to a housing of a driving device at a first axial end and to a housing of a driven device at a second axial end, the bell housing defining an air inlet port and an air outlet port between the first and second axial ends;
   a clutch disposed within the bell housing and configured to transfer torque from an input member coupled to the driving device to an output member coupled to the driven device; and,
   a fan configured for rotation with the input member to draw air into the bell housing through the air inlet port, move air through the bell housing from the air inlet port to the air outlet port in a substantially radial direction across the clutch and exhaust air from the bell housing through the air outlet port
   wherein the fan comprises a plurality of blades formed in or attached to a drive ring of a shaft coupling, the drive ring configured for coupling to the input member for rotation therewith.

2. The power take-off of claim 1 wherein a center of the inlet port is diametrically opposite a center of the outlet port.

3. The power take-off of claim 1 wherein the clutch comprises an electromagnetic clutch.

4. The power take-off of claim 1 wherein the fan comprises a plurality of separate blades configured for rotation with the input member.

5. The power take-off of claim 4 wherein, one of the plurality of blades forms a circular arc and is oriented so that a center of curvature of the circular arc is disposed on a forward side of the circular arc relative to the direction of rotation of the input member.

6. A power take-off, comprising:
   a bell housing disposed about an axis and configured for coupling to a housing of a driving device at a first axial end and to a housing of a driven device at a second axial end, the bell housing defining an air inlet port and an air outlet port between the first and second axial ends;

a clutch disposed within the bell housing and configured to transfer torque from an input member coupled to the driving device to an output member coupled to the driven device; and, a fan configured for rotation with the input member to draw air into the bell housing through the air inlet port, move air through the bell housing from the air inlet port to the air outlet port in a substantially radial direction across the clutch and exhaust air from the bell housing through the air outlet port further comprising a diffuser coupled to the bell housing, the diffuser defining a plurality of outlet passages in fluid communication with the air outlet port in the bell housing.

7. The power take-off of claim 3 wherein a first outlet passage of the plurality of outlet passages is configured with a downward angle such that a first end of the first outlet passage through which air from the air outlet port enters the first outlet passage is further from the axis than a second end of the first outlet passage through which air exits the first outlet passage.

8. A power take-off, comprising:
   a bell housing disposed about an axis and configured for coupling to a housing of a driving device at a first axial end and to a housing of a driven device at a second axial end, the bell housing defining an air inlet port and an air outlet port between the first and second axial ends;
   an electromagnetic clutch disposed within the bell housing and configured to transfer torque from an input member coupled to the driving device to an output member coupled to the driven device;
   an electromagnetic brake disposed within the bell housing and configured to apply a braking torque to the output member; and,
   a fan configured for rotation with the input member to draw air into the bell housing through the air inlet port, move air through the bell housing from the air inlet port to the air outlet port in a substantially radial direction across the electromagnetic clutch and the electromagnetic brake and exhaust air from the bell housing through the air outlet port.

9. The power-take of claim 8, further comprising a shaft coupling having a drive ring configured for coupling to the input member and a driven ring configured for coupling to an armature of the electromagnetic clutch.

10. The power take-off of claim 9 wherein the fan comprises a plurality of blades formed in or attached to the drive ring of the shaft coupling.

11. The power take-off of claim 8 wherein a center of the inlet port is diametrically opposite a center of the outlet port.

12. The power take-off of claim 8 further comprising a diffuser coupled to the bell housing, the diffuser defining a plurality of outlet passages in fluid communication with the air outlet port in the bell housing.

13. The power take-off of claim 12 wherein a first outlet passage of the plurality of outlet passages is configured with a downward angle such that a first end of the first outlet passage through which air from the air outlet port enters the first outlet passage is further from the axis than a second end of the first outlet passage through which air exits the first outlet passage.

14. The power take-off of claim 8 wherein the fan comprises a plurality of blades formed in or attached to a drive ring of a shaft coupling, the drive ring configured for coupling to the input member for rotation therewith.

15. The power take-off of claim 8 wherein the fan comprises a plurality of blades formed in or attached to an armature of the electromagnetic clutch, the armature configured for coupling to the input member for rotation therewith.

16. The power take-off of claim 8 wherein the fan comprises a plurality of separate blades configured for rotation with the input member.

17. The power take-off of claim 16 wherein, one of the plurality of blades forms a circular arc and is oriented so that a center of curvature of the circular arc is disposed on a forward side of the circular arc relative to the direction of rotation of the input member.

* * * * *

UNITED STATES PATENT AND TRADEMARK OFFICE
CERTIFICATE OF CORRECTION

PATENT NO. : 11,852,200 B2
APPLICATION NO. : 17/592955
DATED : December 26, 2023
INVENTOR(S) : Rodney R. Laisure, George Patrick Gill and Gary R. Haasch It is certified that error appears in the above-identified patent and that said Letters Patent is hereby corrected as shown below:

In the Claims

In Column 11, Line 18 (Claim 7), "claim 3" should read "claim 6".

Signed and Sealed this
Thirtieth Day of January, 2024

Katherine Kelly Vidal
*Director of the United States Patent and Trademark Office*